United States Patent
Bond et al.

(10) Patent No.: US 8,275,921 B2
(45) Date of Patent: Sep. 25, 2012

(54) ACCESSING DATA

(75) Inventors: Andy Bond, Bristol (GB); Chris Goodings, Monmouthshire (GB)

(73) Assignee: Icera Inc., Wilmington, DE (US)

( * ) Notice: Subject to any disclaimer, the term of this patent is extended or adjusted under 35 U.S.C. 154(b) by 803 days.

(21) Appl. No.: 12/425,471

(22) Filed: Apr. 17, 2009

(65) Prior Publication Data
US 2009/0271555 A1 Oct. 29, 2009

(30) Foreign Application Priority Data
Apr. 24, 2008 (GB) .................................. 0807503.8

(51) Int. Cl.
G06F 13/42 (2006.01)
G06F 3/00 (2006.01)
G06F 13/28 (2006.01)
G06F 13/00 (2006.01)

(52) U.S. Cl. .............. 710/106; 710/19; 710/22; 710/35; 710/105

(58) Field of Classification Search .................... 710/22, 710/24, 27, 29, 33, 35, 105–106, 305–306, 710/308, 19; 711/1–2
See application file for complete search history.

(56) References Cited

U.S. PATENT DOCUMENTS
| | | | |
|---|---|---|---|
| 5,724,583 A | | 3/1998 | Carmon et al. |
| 6,098,149 A | * | 8/2000 | Ofer et al. ..................... 711/112 |
| 6,915,369 B1 | | 7/2005 | Dao et al. |
| 2003/0214981 A1 | * | 11/2003 | Kocalar et al. ................. 370/537 |
| 2004/0010660 A1 | * | 1/2004 | Konshak et al. ............... 711/114 |
| 2006/0179172 A1 | | 8/2006 | Ayinala et al. |
| 2007/0174509 A1 | | 7/2007 | Day et al. |
| 2007/0296873 A1 | * | 12/2007 | Ironi et al. ..................... 348/726 |

FOREIGN PATENT DOCUMENTS
| | | |
|---|---|---|
| GB | 0807503.8 | 6/2009 |
| WO | WO2004054195 | 6/2004 |

OTHER PUBLICATIONS
Harvey, A.F., et al. "DMA Fundamentals on Various PC Platforms". Application Note 011. National Instruments Corporation. Apr. 1991. pp. 1-18.*

* cited by examiner

Primary Examiner — Thomas J Cleary

(57) ABSTRACT

A method of accessing data in a device comprising: a first integrated circuit having a processor, a memory connected to the processor and a direct memory access engine operatively coupled to the memory and to the microprocessor; a second integrated circuit comprising storage means for holding data values in respective locations, the second integrated circuit being connected to the first integrated circuit via a serial link, the method comprising: the processor generating a plurality of memory access requests independent from one another and supplying a bundle of said independent memory access requests to the direct memory access engine, each memory access request comprising an address of a storage location in the storage means; the direct memory access engine sequentially supplying the memory access requests via the serial link to the second integrated circuit; the second integrated circuit returning a data value responsive to each memory access request and appending to the data value said address of the location where the data value was stored in the storage means; and storing in the memory of the first integrated circuit the returned data value and its appended address.

10 Claims, 3 Drawing Sheets

CLK

DATA_MOSI

DATA_MOSO

CS

ACCESSING DATA

PRIORITY CLAIM

The present application claims the priority of Great Britain Patent Application No. GB 0807503.8 filed Apr. 24, 2008.

FIELD OF THE INVENTION

The present invention relates to accessing data, and in particular to accessing data in a device comprising a first integrated circuit which is connected to a second integrated circuit via a serial link.

BACKGROUND TO THE INVENTION

The present invention particularly but not exclusively relates to a wireless communications device wherein the first integrated circuit comprises a digital baseband chip and the second integrated circuit comprises an analogue baseband chip.

Such a device is known where the first integrated circuit has a processor and a memory connected to the processor. The processor is responsible for the processing functions of the device, which include signal processing of digital samples received from wireless signals which are received and transmitted by the analogue baseband chip. Digital samples from wireless signals received by the analogue baseband chip are transferred to the digital baseband chip over a point-to-point serial link. That link is also used to transfer control data from the analogue baseband chip to the digital baseband chip.

Digital data to be transmitted in the form of a wireless signal is transmitted from the digital baseband chip to the analogue baseband chip over the link.

In addition, the processor may require access to data held on the analogue baseband chip, for example control data.

In essence, there are two classes of data that are transferred between the devices. "Ratio" data (which is converted to/from the radio signal and is a continual ordered stream) and control data (which is not continual and can be out-of-order).

Control data encompasses anything which is used to setup or monitor the analogue baseband system or radio system. Examples of analogue to digital baseband traffic are temperature monitoring, voltage monitoring, transmit power monitoring. Examples of digital to analogue baseband traffic are setup of the A/D and D/A converters and Tx power control.

The processor acts as a so-called soft modem, implementing signal processing by executing code sequences for signal detection, decoding etc. It is important therefore to keep the load of the processor for handling non-signal processing tasks to a minimum. In order to access data from the analogue baseband chip, the processor issues memory access requests which use up processing resource to issue and to handle the response.

A memory access request is transmitted over the serial link to the analogue baseband chip, and the data is returned from the memory location identified in the request. The processor must tag the requests and responses so they can be associated for further processing.

SUMMARY OF THE INVENTION

It is an aim of the present invention to improve the manner in which such memory access requests are handled, particularly for accessing control data.

According to one aspect of the present invention there is provided a method of accessing data in a device comprising: a first integrated circuit having a processor, a memory connected to the processor and a direct memory access engine operatively coupled to the memory and to the microprocessor; and a second integrated circuit comprising storage means for holding data values in respective locations, the second integrated circuit being connected to the first integrated circuit via a serial link, the method comprising: the processor generating a plurality of memory access requests independent from one another and supplying a bundle of said independent memory access requests to the direct memory access engine, each memory access request comprising an address of a storage location in the storage means; the direct memory access engine sequentially supplying the memory access requests via the serial link to the second integrated circuit; the second integrated circuit returning a data value responsive to each memory access request and appending to the data value said address of the location where the data value was stored in the storage means; and storing in the memory of the first integrated circuit the returned data value and its appended address.

Another aspect of the invention provides a device comprising: a first integrated circuit having a processor, a memory connected to the processor and a direct memory access engine operatively coupled to the memory and to the processor; a second integrated circuit comprising storage means for holding data values in respective locations; a serial link connecting the first integrated circuit and the second integrated circuit; wherein the direct memory access engine is operable to sequentially supply memory access requests via the serial link to the second integrated circuit, each memory access request comprising an address of a storage location in the storage means; and the second integrated circuit being operable to return a data value responsive to each memory access request, appending to the data value said address of the location where the data value is stored in the storage means, the returned data value and its appended address being stored in the memory of the first integrated circuit.

For a better understanding of the present invention and to show how the same may be carried into effect reference will now be made by way of example to the accompanying drawings.

DESCRIPTION OF THE PREFERRED EMBODIMENT

A preferred embodiment of the present invention will now be described with reference to FIGS. 1 to 3.

Figure 1:
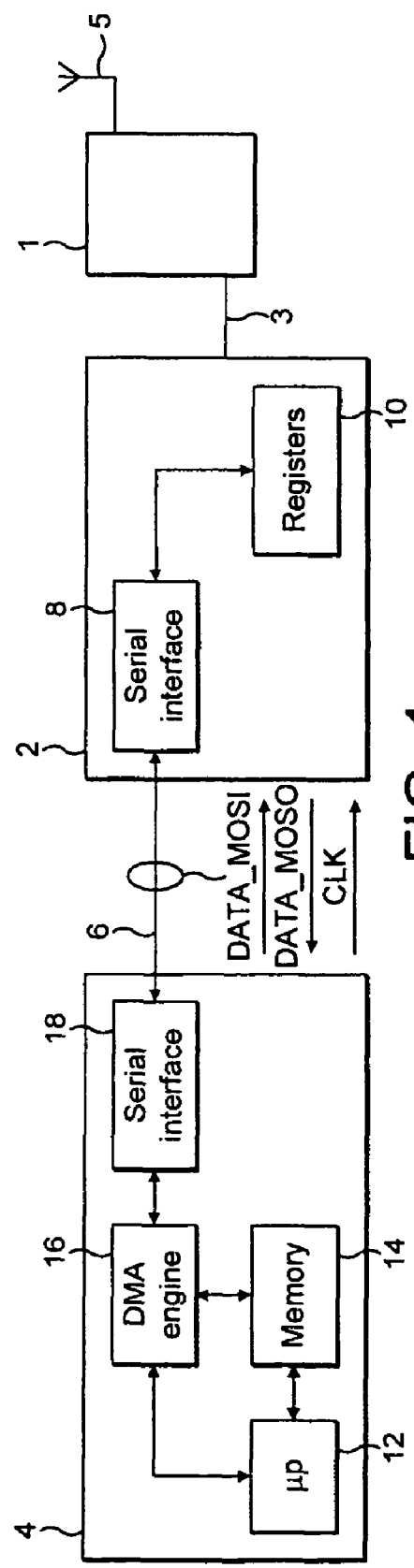
FIG. 1 is a schematic block diagram of a device for use in a wireless communications system.

FIG. 1 is a schematic block diagram of a device for use in a wireless communications system. The device operates to receive and transmit wireless signals. The device comprises an RF transceiver device 1 connected to an analogue baseband chip 2 via an analogue link 3. This is in turn connected to a digital baseband chip 4 via a serial link 6. The analogue baseband chip 2 includes analogue to digital converters (ADC) and digital to analogue converters (DAC) which are used to convert signals from the digital format provided by the digital baseband chip 4 to the analogue format required by the RF transceiver device 1. The data which is converted to or from radio frequencies in the RF transceiver device 1 and sent or received over an RF antenna 5 is known as the radio data stream. The analogue baseband chip 2 also measures and controls signals which are not directly converted to RF, such as temperature, power and voltage. The data from these signals is also communicated over the serial link 6 and is referred to herein as control data.

Registers 10 in the analogue baseband chip 2 hold digital data ready for transmission via the serial interface 8 over the link 6 or received from the link 6 via the serial interface 8.

The radio data stream to and from the RF transceiver is not necessarily sent over the same serial interface as the control data. In the present embodiment, the radio data stream is actually sent over a different, parallel interface. However, in some embodiments the radio data stream and the control data could be sent over the same interface. It is also possible that in some embodiments the functions of the analogue baseband and the RF transceiver are merged into a single device.

The digital baseband chip 4 comprises a microprocessor 12 which is responsible for the device's processing functions. This includes signal processing of digital samples received from the wireless signals, generation of digital samples to be converted and transmitted to the analogue baseband chip and general operational and housekeeping functions. The microprocessor 12 communicates with a memory 14 (e.g. RAM) which holds data for use by the microprocessor 12. Data received from the analogue baseband chip 2 via the serial link 6 is held in the memory 14. To reduce the load on the microprocessors 12, memory accesses are implemented by a DMA engine 16. Where a memory access requires data from the analogue baseband chip 2, the DMA engine 16 uses a serial interface 18 to dispatch a memory access request (MAR) over the link 6 to retrieve data from the registers 10.

Direct memory access (DMA) engines are known for the purpose of accessing memory to reduce the load on a microprocessor. Generally however they are used in the context where a number of accesses are to be made from a block of sequential memory addresses, such as processing graphics data for example. When the requested data is returned, it is returned as a block and so its location when stored in memory is relatively easy for the microprocessor to ascertain. In a wireless communications device of the type described above, the processor is responsible for executing a number of different processes and can generate memory access requests from the different processes. It would generally not be efficient to use a DMA engine in this context, because it would be difficult for software executed on the processor to make the connection between data which has been returned, and the location in the analogue baseband chip from which it was requested and returned.

The context in which the DMA engine 16 is used in the present case is different from the context in which they are generally known. The microprocessor 12 is responsible for executing a number of different processes and can generate memory access requests from the different processes. A bundle of memory access requests is outsourced by the processor to the DMA engine 16, but the memory access requests are independent of one another and may come from different processes. Once a bundle of memory access requests has been received by the DMA engine, it dispatches each request in the bundle in turn via the serial interface 18 over the link 6. The DMA engine handles memory access requests for locations off-chip (in chip 2) and also requests from the microprocessor for which the data is stored in the memory 14.

A memory access request received by the serial interface 8 of the analogue baseband chip 2 (DATA_MOSI) recalls data from the registers 10 and returns the data to the memory 14 over the link 6. The link 6 comprises a set of wires, three of which are shown in FIG. 1 identified by their signal names DATA_MOSI, DATA_MOSO, CLK. Each wire carries information or requested pulses on bits. When data is read back from the analogue baseband chip 2 over the serial link 6 (DATA_MOSO), results end up in the memory block 14 and it would be very difficult for software executed on the microprocessor 12 to make the connection between the result which has been returned and the register in the analogue baseband chip 2 from which it came. To overcome this, the described embodiment of the present invention provides a mechanism whereby when data is read back from the analogue baseband chip 2 to the digital baseband chip 4, the register address is appended to the data. Therefore, the memory location in the memory block 14 in the digital baseband chip 4 contains both the read-back data and the register address from which it came. This makes the task of software being executed on the microprocessor 12 much easier.

Figure 2A:
FIGS. 2a to 2d are timing diagrams.

Digital data is passed between the digital baseband chip 4 and the analogue baseband chip 2 over the interface 6 under the control of the digital baseband chip 4. FIG. 2*a* shows the clock signal CLK for the digital baseband chip 4 which controls the timing of data transfers. The clock signal is transferred over the interface.

Figure 2B:
Figure 2C:

FIG. 2*b* shows a memory access request (MAR) being transmitted as signal DATA_MOSI. The MAR comprises a single bit identifying whether it is a read or write access to the analogue baseband and the address of a location where data is stored. The address is denoted $a0 \ldots a5$. FIG. 2*c* shows the returned data DATA_MOSO, denoted $d0 \ldots d17$, with the appended address similarly denoted $a0 \ldots a5$.

Figure 2D:
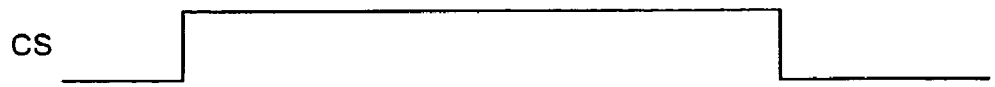

For the sake of completeness, FIG. 2*d* shows a chip select signal CS which rises to indicate the start of the transfer and falls to indicates the end of the transfer.

The return of data with an associated address has been used previously in the context of packet switched networks, where the source of the MAR can be connected to any of a plurality of response devices, and where there maybe multiple sources in the network. However, it is used in the present invention in the context of link with two fixed end points to allow a DMA engine to be used in a wireless device.

The described embodiment of the present invention provides a way of reducing the load on the microprocessor. This is particularly important in a soft modem environment where digital samples of the radio signals are processed by executing programs on the microprocessor, for example to implement signal detection, decoding etc. In this context it is important to keep to a minimum the load of the processor for handling non-signal processing tasks.

Figure 3:
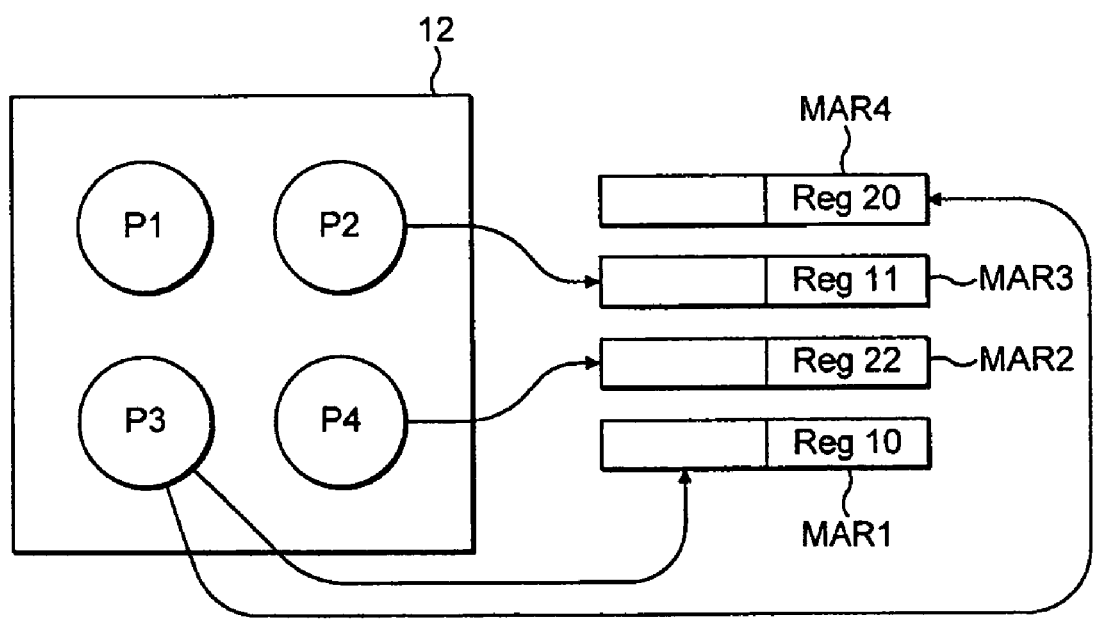
FIG. 3 is a sketch illustrating the generation of independent memory access requests.

FIG. 3 illustrates the concept of independent memory access requests in a bit more detail. The microprocessor 12 executes a number of different processes, and these processes can be interleaved on a time basis in a manner known per se. In FIG. 3, four processes are shown diagrammatically P1, P2, P3 and P4. A first memory access request MAR1 is generated by the process P3 requesting an access from register 10. A second memory access request MAR2 is generated by process P4 requesting an access to register 22. A third memory access request is generated by process P2, requesting access to register 11. Then, another memory access request MAR4 is again generated by a process P3. This carries on until a bundle of sufficient size has been accumulated by the DMA engine for it to act on. While the DMA engine is implementing the memory access requests, the microprocessor 12 can revert to executing other processes. A useful feature of this invention is that the DMA can handle MARs in any order, since any "out of order" returns will still be tagged by the correct address. Embodiments of the invention allow the analogue baseband chip 2 to return results out of order. This is be useful if, for example, high priority data (such as the radio data stream) was being returned on the same interface as low priority data (such as temperature measurements).

The first memory access request 1 is transmitted by the DMA engine 16 over the serial link 6 and the serial interface 8 is responsible for retrieving data from register 10 from the block of register 10. This data is returned over the serial link 6 appended to the identity of register 10. The returned data is held in memory 14 associated with the identity of register 10.

An example of the type of data that may be requested from the analogue baseband chip 2 is control information, such as temperature measurements made by the analogue baseband chip 2 and required by the microprocessor 12 for processing signal samples, transmit power records or supply voltage measurements.

What is claimed is:

1. A method of accessing data in a device comprising:
   a first integrated circuit having a processor, a memory connected to the processor and a direct memory access engine operatively coupled to the memory and to the microprocessor;
   a second integrated circuit comprising storage means for holding data values in respective locations, the second integrated circuit being connected to the first integrated circuit via a serial link, the method comprising:
   the processor generating a plurality of memory access requests independent from one another and supplying a bundle of said independent memory access requests to the direct memory access engine, each memory access request comprising an address of a storage location in the storage means;
   the direct memory access engine sequentially supplying the memory access requests via the serial link to the second integrated circuit;
   the second integrated circuit returning a data value responsive to each memory access request and appending to the data value said address of the location where the data value was stored in the storage means; and
   storing in the memory of the first integrated circuit the returned data value and its appended address.

2. A method according to claim 1, wherein the storage means comprises registers.

3. A method according to claim 1, wherein the serial link comprises a set of wires, each wire carrying a respective signal in the form of sequential bits.

4. A method according to claim 1, wherein at least one of the processes implemented by the microprocessor is for processing digital samples from wireless signals.

5. A method according to claim 1, wherein at least one of the data values represents one of temperature; transmit power; and supply voltage.

6. A device comprising:
   a first integrated circuit having a processor, a memory connected to the processor and a direct memory access engine operatively coupled to the memory and to the processor;
   a second integrated circuit comprising storage means for holding data values in respective locations;
   a serial link connecting the first integrated circuit and the second integrated circuit;
   wherein the direct memory access engine is operable to sequentially supply memory access requests via the serial link to the second integrated circuit, each memory access request comprising an address of a storage location in the storage means; and
   the second integrated circuit being operable to return a data value responsive to each memory access request, appending to the data value said address of the location where the data value is stored in the storage means, the returned data value and its appended address being stored in the memory of the first integrated circuit.

7. A device according to claim 6, wherein the second integrated circuit comprises an analogue baseband circuit for receiving and transmitting wireless signals.

8. A device according to claim 6, wherein the processor of the first integrated circuit is operable to process digital samples received from wireless signals transmitted over the serial link.

9. A wireless communications device comprising:
   a first integrated circuit having processing means, storage means connected to the processor and direct memory access means operatively coupled to the storage means and to the processing means;
   a second integrated circuit comprising second storage means for holding data values in respect of locations;
   a serial link operative to connect the first and second integrated circuits;
   wherein the direct memory access means is operable to sequentially supply memory access requests via the serial link to the second integrated circuit, each memory access request comprising an address of a storage location in the second storage means; and
   the second integrated circuit being operable to return a data value responsive to each memory access request, appending to the data value said address as a location where the data value is stored in the second storage means, the return data value and its appended address being stored in the first storage means of the first integrated circuit.

10. A wireless communications device according to claim 9, wherein the processing means of the first integrated circuit is operable to process digital samples received from wireless signals transmitted over the serial link.

* * * * *